(12) United States Patent
Cohen

(10) Patent No.: US 6,302,338 B1
(45) Date of Patent: Oct. 16, 2001

(54) DRIP IRRIGATION LINES

(76) Inventor: Amir Cohen, Yuvalim, 20 124, Doar Na Misgav (IL)

( * ) Notice: Subject to any disclaimer, the term of this patent is extended or adjusted under 35 U.S.C. 154(b) by 0 days.

(21) Appl. No.: 09/582,475

(22) PCT Filed: Dec. 21, 1998

(86) PCT No.: PCT/IL98/00620

§ 371 Date: Jun. 27, 2000

§ 102(e) Date: Jun. 27, 2000

(87) PCT Pub. No.: WO99/33571

PCT Pub. Date: Jul. 8, 1999

(30) Foreign Application Priority Data

Dec. 28, 1997 (IL) ......................................................... 122777

(51) Int. Cl.[7] .................................................. B05B 15/00
(52) U.S. Cl. ............................ 239/542; 239/547; 138/46; 137/854; 137/614.2
(58) Field of Search ..................................... 239/542, 546, 239/547, 562, 566, 568, 571, 109, 464, 533.1, 533.13; 138/42, 43, 45, 46; 137/854, 852, 614.2, 517

(56) References Cited

U.S. PATENT DOCUMENTS

| | | | |
|---|---|---|---|
| 3,685,735 | * | 8/1972 | Foster . |
| 4,148,438 | * | 4/1979 | Moen . |
| 4,502,631 | * | 3/1985 | Christen ................................ 239/542 |
| 4,573,640 | * | 3/1986 | Mehoudar ............................. 239/542 |
| 4,687,143 | * | 8/1987 | Gorney et al. ........................ 239/542 |
| 5,183,208 | * | 2/1993 | Cohen . |
| 5,279,462 | * | 1/1994 | Mehoudar ............................. 239/542 |
| 5,400,973 | * | 3/1995 | Cohen . |
| 5,609,303 | * | 3/1997 | Cohen ................................... 239/542 |
| 5,615,838 | * | 4/1997 | Eckstein et al. ................... 239/533.1 |
| 5,628,462 | * | 5/1997 | Miller ................................... 239/542 |
| 6,027,048 | * | 2/2000 | Mehoudar ............................. 239/542 |

* cited by examiner

Primary Examiner—David A. Scherbel
Assistant Examiner—Dinh Q. Nguyen

(57) ABSTRACT

A drip irrigation line includes a plurality of emitter units secured within a water supply tube such that each emitter unit defines with the tube a flow-control passageway having an inlet port communicating with the interior of the water supply tube and an outlet port communicating with a water discharge opening in the water supply tube. Each emitter unit includes a one-way valve at one of the ports. Such port has an opening circumscribed by a cylindrical boss, and the one-way valve thereat includes a cap having a skirt of elastomeric material normally engaging the outer surface of the cylindrical boss to block reverse water flow into the flow-control passageway, but is deformable under water pressure to permit forward flow from the tube interior into the flow-control passageway.

9 Claims, 3 Drawing Sheets

FIG. 1
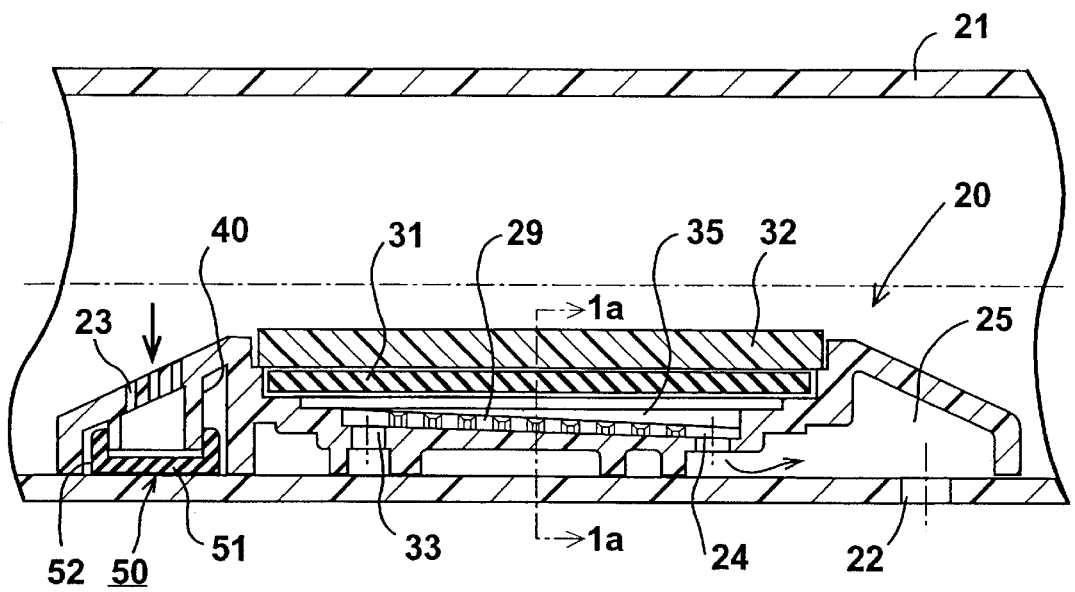
FIG. 1a
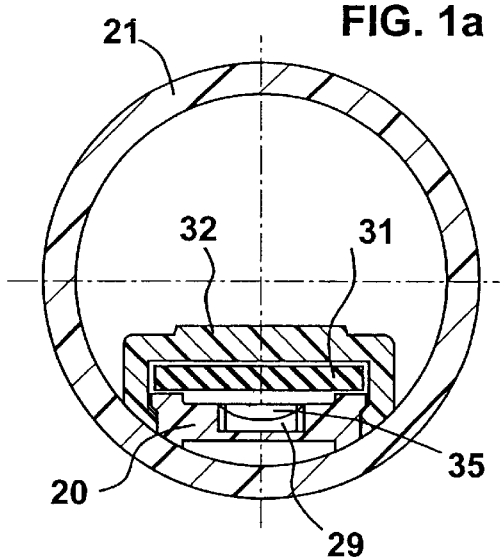
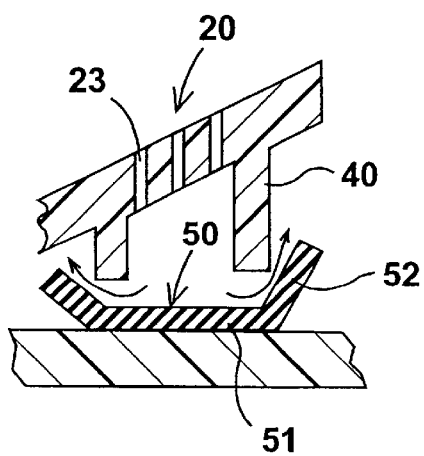
FIG. 1b

DRIP IRRIGATION LINES

FIELD AND BACKGROUND OF THE INVENTION

The present invention relates to drip irrigation lines, and particularly to drip irrigation lines which include a plurality of emitter units secured within a water supply tube for discharging water therefrom at a low rate.

Irrigation emitters are commonly constructed with relatively large passageways to reduce the sensitivity of the emitter to clogging by particles in the irrigation water. However, such emitters may also be clogged by external particles, e.g., dirt entering the emitters via the water discharge openings. The problem is particularly acute when a drip irrigation line is emptied since this produces a vacuum within the line which tends to suck external particles into the emitter units via the water discharge openings. For this reason, special pains are frequently taken in installing a drip irrigation line to expose the water discharge openings to the air and not to the soil, but even then, there is still a large tendency of external solid particles to enter the line via the water discharge openings particularly when the line is emptied.

It is known to provide drip irrigation emitters with a one-way valve at the inlet to prevent undesirable discharge or leakage of water when the line pressure is not sufficient for drip irrigation purposes; see, for example, Mehoudar U.S. Pat. Nos. 5,279,462 and Eckstein et al 5,615,838. Such emitters utilize the membranes provided for the function of pressure-compensation also for the function of acting as a one-way valve at the inlet to prevent water discharge or leakage at unduly low line pressures. The fad that the same membrane serves both the one-way valve function, and also the pressure-compensation function, makes it difficult to design it so that it optimally serves both functions for each application.

OBJECTS AND BRIEF SUMMARY OF THE INVENTION

An object of the present invention is to provide a drip irrigation line having a one-way valve, which is independent of the flow-control passageway of the line, to produce reduced sensitivity to clogging by the entry of external particles via the water discharge openings. Another object of the present invention is to provide such drip irrigation lines with additional advantages, including the ability to save water, to operate when buried under the ground, and/or to discharge the water in the form of pulses.

According to a broad aspect of the present invention, there is provided a drip irrigation line, comprising: a water supply tube for conducting water therethrough and having a plurality of water discharge openings spaced along its length; and a plurality of emitter units secured within the water supply tube such that each emitter unit defines with the tube a flow-control passageway having an inlet port communicating with the interior of the water supply tube, and an outlet port communicating with a water discharge opening in the water supply tube, each of the emitter units including a one-way valve at one of the ports permitting water flow in the forward direction from the interior of the water supply tube towards a water discharge opening thereof, but blocks water flow in the reverse direction from the water discharge opening towards the interior of the water supply tube; characterized in that the port which includes the one-way valve comprises an opening circumscribed by a cylindrical boss projecting from the downstream side of the opening facing the water discharge outlet in the water supply tube; and in that the one-way valve includes a cap having an end wall engageable with the inner surface of the water supply tube, and a skirt of elastomeric material normally engaging the outer surface of the cylindrical boss to block water flow through the one-way valve, but deformable under water pressure to permit water flow in the forward direction.

In one described embodiment, the end wall of the cap is also made of elastomeric material and is integrally formed with the skirt; and in another described embodiment, the end wall of the cap is made of rigid material joined to the skirt of elastomeric material.

According to additional features in another described embodiment, the cylindrical boss is formed with an axial slot extending a short distance from the outer edge of the boss and completely covered by the elastomeric skirt of the cap in the normal, non-deformed condition of the skirt. More particularly, in that described preferred embodiment, the cylindrical boss is formed with a plurality of the axial slots, the slots being circumferentially spaced around the circumference of the outer edge of the boss.

In some described embodiments, the one-way valve is located at the inlet port, and in another described embodiment, it is located at the outlet port.

A drip irrigation line constructed in accordance with the foregoing features will thus prevent external dirt particles from being drawn into the emitter units when the water supply tube is emptied despite the vacuum produced in the water supply tube. Also, when the line including such units is initially filled with water, or when the pressure in the line otherwise is below the predetermined minimum, the one-way valve remains closed, thereby preventing a discharge of the water under such low pressure conditions and producing significant savings in the water. Moreover, during non-operating conditions of the emitter lines, the outlets being thus blocked prevent the entry not only of solid particles, but also of air and moisture which can promote the growth of organisms within the emitter lines. These advantages permit the emitter lines to be buried in the ground. A further advantage is that such emitter lines can also be operated to output pulses, rather than a continuous trickle flow.

Since the one-way valve provided by this construction is independent of the structure of the flow-control passageway in the drip irrigation line, both the one-way valve and the flow-control passageway can each be designed for optimum performance of one without affecting the performance of the other, for each particular application.

Further features and advantage of the invention will be apparent from the description below.

BRIEF DESCRIPTION OF THE DRAWINGS

The invention is herein described, by way of example only, with reference to the accompanying drawings, wherein:

FIG. 1 is a fragmentary, longitudinal-sectional view of one form of drip irrigation line constructed in accordance with the present invention, this view illustrating only one emitter unit in the line;

FIG. 1a is a transverse sectional view along line 1a—1a of FIG. 1;

FIG. 1b is an enlarged fragmentary view illustrating the operation of the one-way valve in the emitter unit of FIG. 1;

DESCRIPTION OF PREFERRED EMBODIMENTS

Figure 2:
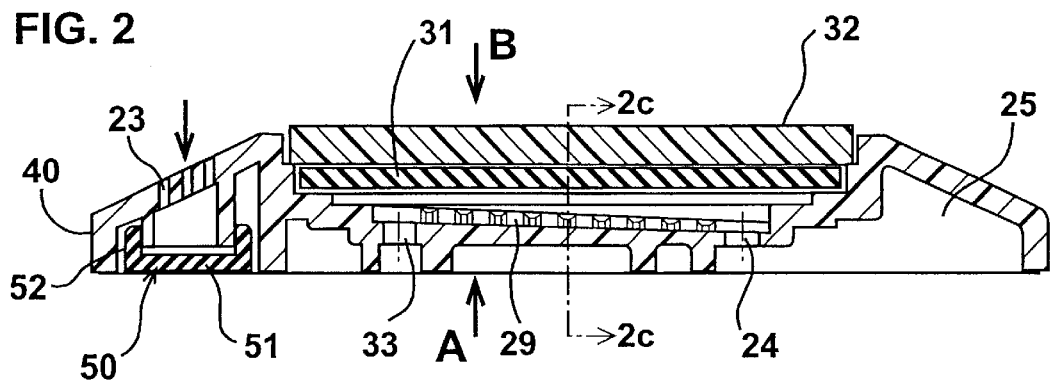
FIG. 2 is a longitudinal sectional view illustrating only the emitter unit in FIG. 1.

The drip irrigation emitter line illustrated in FIG. 1 is of the type described in my prior U.S. Pat. Nos. 5,400,973, 5,609,303 and 5,634,594, the disclosures of which are hereby incorporated by reference, except that the illustrated emitter unit has been modified in accordance with the present invention.

Thus, the drip irrigation line illustrated in FIG. 1 includes a plurality of emitter units, only one of which is shown at 20, secured as by heat welding, within the water supply tube 21 so as to define a flow control passageway communicating with the interior of the water supply tube, and a water discharge opening 22 in the water supply tube.

The inlet port to the flow control passageway defined by the emitter unit 20 is in the form of a plurality of narrow slits 23 which filter the water before reaching the flow-control passageway. The outlet port 24 from the flow control passageway leads to a recess 25 aligned with the respective discharge opening 22 in the water supply tube 21.

The flow control passageway through the emitter unit 20 includes a flowpath 26 (FIG. 2a) leading from inlet slits 23 to a flow-reducing labyrinth defined by baffles 28 and the inner face of the water supply tube 21, and a flow-regulating labyrinth defined by baffles 29 (FIG. 2b) and an elastomeric membrane 31 downstream of baffles 28. Membrane 31 is secured to the emitter unit 20 by a cap 32 whose ends are heat-welded to the inner face of tube 20. The inlet to the labyrinth of baffles 29 is shown at 33, and its outlet is shown at 24.

As described in the above-cited patents, baffles 28 are all of the same height so that they define, with the inner face of the water supply tube 21, a flow-reducing labyrinth which produces a fixed pressure drop in the water flowing through it. Baffles 29, however, define with the inner face of membrane 31 a flow-regulating labyrinth, sometimes called a pressure-compensated labyrinth, which regulates the flow through it in response to the pressure within the water supply tube 21. Thus, baffles 29 are of decreasing height to define clearances 35 of increasing height from the inlet 33 of this labyrinth to the outlet 24. The opposite face of membrane 31 is exposed to the pressure within the water supply tube 21 via the inlet slits 23, such that, with an increase in pressure in the water supply tube, the membrane sequentially closes the clearances 35 defined by its inner face and baffles 29, to thereby regulate the flow through this labyrinth in response to pressure.

Further information concerning the construction and operation of such drip irrigation emitters are set forth in the above-cited patents incorporated herein by reference.

According to the present invention, either the inlet ports (slits 23) to the flow control passageway of labyrinths 28 and 29, or the outlet port 24 from that passageway, is provided with a one-way valve which permits water flow in the forward direction from the interior of the water supply tube 21 towards a water discharge opening 22, but blocks water flow in the reverse direction, from the water discharge opening 22 towards the interior of the water supply tube.

Figure 2A:
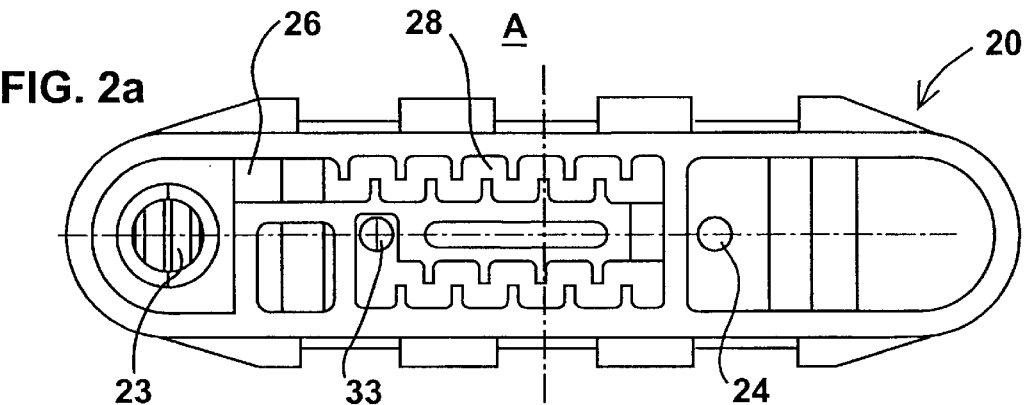
FIG. 2a is a plan view illustrating the emitter unit of FIG. 2 from the direction "A" in FIG. 2, with the one-way valve removed.
Figure 2B:
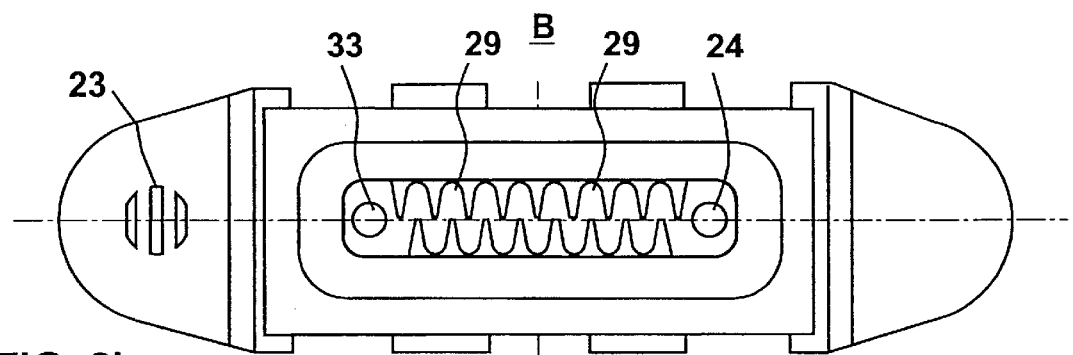
FIG. 2b is a plan view illustrating the emitter unit of FIG. 2 from the direction "B" of FIG. 2 with the membrane and cover removed.
Figure 2C:
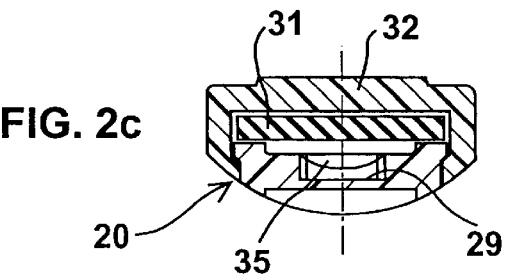
FIG. 2c is a transverse sectional view along line 2c—2c of FIG. 2.

FIGS. 1 and 2 illustrate one construction wherein the one-way valve is provided at the inlet port to the flow control passageway of labyrinths 28 and 29. Thus, as shown in FIGS. 1 and 2, this inlet port includes, in addition to the plurality of slit opening 23, a cylindrical boss 40 circumscribing the inlet openings 23 and projecting from the downstream side of those openings, i.e., towards the inner face of the water supply tube 21. A one-way valve in the form of a cap 50, is applied over the open end of the cylindrical boss 40 such that the end wall 51 of cap 50 engages the inner face of the water supply tube 21. Cap 50 is made of a suitable elastomeric material, such as natural or synthetic rubber, and includes, in addition to the end wall 51, an annular skirt 52 which normally engages the outer face of the cylindrical boss 40 adjacent to its open end.

It will thus be seen that elastomeric cap 50 normally blocks the water flow from the interior of the water supply tube 21 through the inlet openings 23 to flowpath 26 (FIG. 2a) leading to the flow control passageway defined by the two labyrinths 28 and 29. However, as shown in Fig. 1b, when the water within tube 21 is at a predetermined minimum pressure, skirt 52 of the elastomeric cap 50 is deformed outwardly by the water pressure, to permit water flow in the forward direction from inlet openings 23, via flowpath 26 to inlet 33, through the two labyrinths 28, 29, through the outlet port 24, and finally through the discharge opening 22 in the water supply tube 21.

The emitter line illustrated in FIGS. 1 and 2 operates as follows:

During the filling of the line, the water enters the inlet openings 23 of the respective emitter unit 20, but the elastomeric cap 50 at first blocks the flow to flowpath 26 into the water control passageways defined by the labyrinths 28 and 29 until there is a minimum pressure build-up causing the skirt 52 of cap 50 to flex outwardly, as shown in FIG. 1b. This permits water to then flow from the interior of the water supply tube 21 into the flow control passageway of labyrinths 28 and 29 and out through the outlet port 24 and the discharge opening 22. However, elastomeric cap 50 blocks the water flow in the reverse direction, i.e., inwardly through the discharge opening 22, even if a negative pressure is present with the water supply tube.

The described construction thus prevents the entry of foreign particles which might otherwise occur particularly during the emptying of the emitter line because of the vacuum produced in such a line. In addition, since elastomeric cap 50 normally closes the inlet port 23 and opens it only when the water pressure within the tube 21 has attained a predetermined minimum value suitable for drip irrigation, the elastomeric cap blocks the discharge of water from the line when the line pressure condition is not suitable for drip irrigation, and thereby prevents water wastage. A still further advantage is that, by controlling the tightness of the elastomeric cap 50 and its elasticity, a pulsating-type water discharge can be produced. This has a number of recognized advantages in drip irrigation over a continuous discharge.

Figure 3:
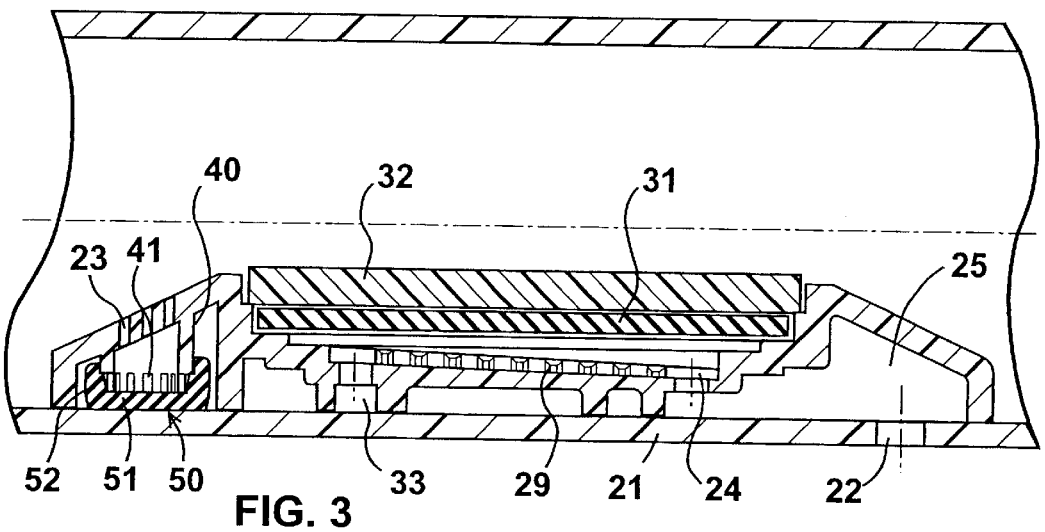
FIGS. 3, 4 and 5 are views similar to that of FIG. 1, but illustrating three modifications in the construction or location of the one-way valve in the emitter unit.

FIG. 3 illustrates a modification, wherein the cylindrical boss 40 is provided with a plurality of short axially-extending slots 41 circumferentially spaced around the outer end of the boss. These slots 41 are covered by the annular skirt 52 of the elastomeric cap 50 in its normal condition, but permit a larger flow around the cap when the skirt is deformed as shown in FIG. 1b.

Figure 4:
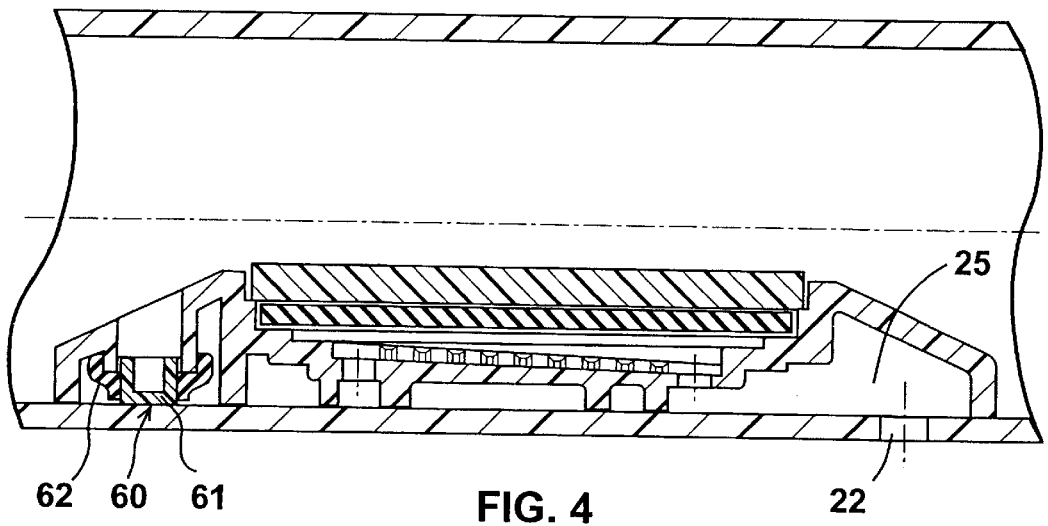

FIG. 4 illustrates a modification in the construction of the cap, therein designated 60, controlling the flow through the inlet openings 23. In this modification, the cap 60 is of a two-part construction, in which the end wall 61 is of rigid material, and the annular skirt 62 is of elastomeric material secured to the end wall.

Cap 60 in FIG. 4, however, operates in substantially the same manner as cap 50 in FIGS. 1 and 2.

Figure 5:
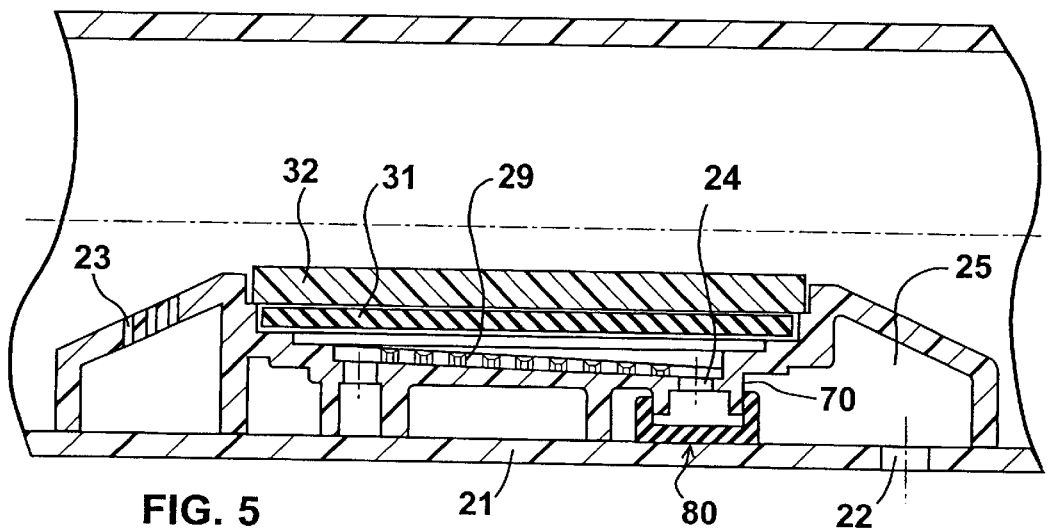

FIG. 5 illustrates a further modification wherein the one-way valve is at the outlet port 24 from the flow control passageway of labyrinths 28 and 29, rather than at the inlet port 23. Thus as shown in FIG. 5, the outlet port includes a cylindrical boss 70 circumscribing the outlet port 38, and an elastomeric cap 80 normally closing the outer end of boss 70. Cap 80 operates in the same manner as cap 50 of FIG. 1, to permit water flow in the forward direction towards the discharge opening 22 in the water supply tube 21, but to block the flow in the reverse direction.

While the invention has been described with respect to several preferred embodiments, it will be appreciated that these are set forth merely for purposes of example, and that many other variations, modifications and applications of the invention may be made.

What is claimed is:

1. A drip irrigation line, comprising:

a water supply tube for conducting water therethrough and having a plurality of water discharge openings spaced along its length;

and a plurality of emitter units secured within the water supply tube such that each emitter unit defines with the tube a flow-control passageway having an inlet port communicating with the interior of the water supply tube, and an outlet port communicating with a water discharge opening in the water supply tube;

each of said emitter units including a one-way valve at one of said ports permitting water flow in the forward direction from the interior of the water supply tube towards a respective water discharge opening thereof, but blocks water flow in the reverse direction from the respective water discharge opening towards the interior of the water supply tube;

characterized in that said port which includes said one-way valve comprises an opening circumscribed by a cylindrical boss projecting from the downstream side of the opening facing the respective water discharge opening in the water supply tube;

and in that said one-way valve includes a cap having an end wall engageable with the inner surface of said water supply tube, and a skirt of elastomeric material normally engaging the outer surface of the cylindrical boss to block water flow through said one-way valve, but deformable under water pressure to permit water flow in said forward direction.

2. The line according to claim 1, wherein said end wall of the cap is also made of elastomeric material and is integrally formed with said skirt.

3. The line according to claim 1, wherein said end wall of the cap is made of rigid material joined to said skirt of elastomeric material.

4. The line according to claim 1, wherein said cylindrical boss is formed with an axial slot extending a short distance from the outer edge of the boss and completely covered by said elastomeric skirt of said cap in the normal, non-deformed condition of said skirt.

5. The line according to claim 4, wherein said cylindrical boss is formed with a plurality of said axial slots, said slots being circumferentially spaced around the circumference of the outer edge of said boss.

6. The line according to claim 1, wherein said opening in the inlet port is in the form of a plurality of slits of small cross-sectional area to filter the water flowing from the interior of said water supply tube into said flow-control passageway.

7. The line according to claim 1, wherein said flow-control passageway includes a flow-reducing labyrinth and a flow-regulating labyrinth downstream thereof.

8. The line according to claim 1, wherein said one-way valve is located at said inlet port.

9. The line according to claim 1, wherein said one-way valve is located at said outlet port.

* * * * *